Patented Feb. 14, 1933

1,897,956

UNITED STATES PATENT OFFICE

JAMES S. OFFUTT, OF CHICAGO, ILLINOIS, ASSIGNOR TO UNITED STATES GYPSUM COMPANY, OF CHICAGO, ILLINOIS, A CORPORATION OF ILLINOIS

PLASTER COMPOSITION

No Drawing.    Application filed March 13, 1930.    Serial No. 435,652.

This invention relates to a plaster composition, and has reference more particularly to a plaster composition suitable for use in the finishing of walls and ceilings of buildings.

Plastering practice has standardized on the application of three layers of cementitious material to the walls and ceilings of buildings, over the wood or gypsum lath, the first coat being called the scratch coat, the second a brown coat, and the third a finish coat. My invention is concerned primarily with the production of a plaster composition for the finish coat, said composition having superior qualities for this particular purpose.

By far the most widely used material for the finishing coat on walls and ceilings is lime putty, which has been gauged with 20 to 30% by weight of gypsum gauging plaster. In the preparation of this finish, it is necessary to soak the lime 16 to 24 hours previous to its use, it is screened and then mixed into the necessary gauging plaster to produce a definite set and permit troweling and polishing of the surface. This type of finishing plaster has an initial strength, due to the setting action of the gypsum, and a final strength due to the very slow carbonization of the lime putty. This high lime type of finishing plaster has the great advantage of low cost, good coverage, excellent spreading characteristics, and trowels and polishes very well. A lime putty job, when executed by a good craftsman, presents a very pleasing finish of white color, and good hardness after several days. However, the lime finishing plaster has the disadvantages that it is entirely alkaline in character and burns any oil decorative material put on its surface. It is also hard on the hands of the workman, causing him to be troubled with sore hands. It is inconvenient to prepare for use, in that it requires long soaking, and even then it must be screened to remove any lumps. The lime putty also requires very careful mixing, and proper proportioning of the calcined gypsum and the lime.

An object of this invention, therefore, is to provide an improved plaster composition suitable for application to the walls and ceilings of buildings; also to improve plaster compositions and their methods of manufacture in other respects hereinafter specified and claimed.

My composition has the following preferred formula:

|  | Per cent |
|---|---|
| Ball milled calcined gypsum | 30 |
| Hydrated dolomitic lime | 20 |
| Ball milled limestone, or marble | 47 |
| Short fibered asbestos | 3 |

I preferably, but not necessarily, add to the above mixture, commercial retarder to the extent of about 0.2–0.8%, usually about 0.4% of the mixture so as to produce a setting time of the composition when mixed with water of 1 to 2 hours. The proportions of the different ingredients may be varied with good results as follows:

|  | Per cent |
|---|---|
| Ball milled calcined gypsum | 20–40 |
| Hydrated dolomitic lime | 10–30 |
| Ball milled limestone or marble | 35–55 |
| Short fibered ground asbestos | 2–5 |

My improved finishing plaster is also suitable for texturing when used neat to produce a variety of attractive finish designs. It may be also mixed with lake or silica sand to produce a good sand float material which is also suitable for low textures. It is especially advantageous for use in winter time construction, when the soaking of lime is a troublesome and costly operation.

In compounding the materials for my composition, I preferably but not necessarily ball mill regular first settle calcined gypsum separately from the other materials. This ball milling may be accomplished in a ball mill 5 ft. in diameter and 22 ft. long, at the rate of 4 tons per hour, the ball mill being loaded with approximately 8 to 10 tons of manganese steel balls. For the dolomitic hydrated lime, I prefer a lime which is fresh, which has been hydrated properly, and which soaks quickly. The limestone may be ball milled in the same type of ball mill used for the calcined gypsum, and this ball milling operation causes the limestone to become a very plastic, inert material, most of which passes a 300 mesh screen, the ball milling being at the rate of 2 to 4 tons per hour. The asbestos may be added to the ball mill with the limestone, or it may be separately ground in a buhr mill with a small quantity of limestone to produce a mixture of marble dust and asbestos, which can be later mixed with the ball milled limestone. The grinding in the buhr mill causes the asbestos fiber to be dispersed in the marble dust and shortened by the abrasive action of the limestone, thereby producing a very uniform dispersion of asbestos on marble dust. The resulting composition has a fineness such that 95 to 99% passes the 300 mesh screen when washed through with water, and a normal consistency of about 80 cc. of water per hundred grams of material.

It is evident that the constituents of my composition are carefully selected, and the percentage variation carefully determined in order to obtain the desired results. The use of a large amount of calcined gypsum, that is over 40%, produces a rolling and curling characteristic under the trowel, which is undesirable. Ball milling of the calcined gypsum reduces the curling and rolling action to a very marked degree. Excessive ball milling is not desirable, however, as it makes a very hard mixing and lumping material. A rate of 3 to 6 tons per hour with the size mill specified is the range which produces the most satisfactory working characteristic. The use of more than 30% lime produces a slow soaking formula and one in which the material is apt to crack due to the absorption of the water by the lime. Below 10% of lime defeats the purpose of the lime gypsum combination which is so effective in the prevention of efflorescence and the production of good bonding conditions. The proper percentage of lime gives a composition which polishes well and presents a surface which is not subject to weakening under conditions of high humidity. The use of more than 55% of ball milled limestone would result in a very quick setting or freezing material having a low body; with less than 30% limestone, the remainder of the formula would be unbalanced and it would be necessary to add something of a similar nature, or else increase the percentage of cementing material. It is not desirable to use more than 5% of the short fiber asbestos, as a very high consistency would result, with a resulting decrease in shrinkage and a decrease in strength. Below 2% asbestos would greatly reduce the ease of mixing of the formula, in good spreading and slip, and would also manifest itself by a reduction in the consistency.

I have found that certain other materials may be used as substitutes for the materials mentioned. Instead of limestone, I may use a ball milled burned clay, pyrophyllite, or other ball milled inert materials. Instead of ball milling the entire calcined gypsum, it is possible to highly ball mill a portion of the calcined gypsum and mix some of this very fine material with calcined gypsum which has been ground in the ordinary manner, and yet obtain the same resulting composition.

I would state in conclusion, that while the illustrated examples constitute practical embodiments of my invention, I do not wish to limit myself precisely to these details, since manifestly, the same may be considerably varied without departing from the spirit of the invention, as defined in the appended claims.

Having thus described my invention, I claim as new and desire to secure by Letters Patent:

1. A plaster composition comprising:

| | Per cent |
|---|---|
| Ball milled calcined gypsum | 20–40 |
| Hydrated lime | 10–30 |
| Ball milled limestone | 35–55 |
| Ground asbestos | 2–5 |
| Retarder | 0.2–0.8 |

2. A plaster composition comprising approximately:

| | Per cent |
|---|---|
| Ball milled calcined gypsum | 30 |
| Hydrated dolomitic lime | 20 |
| Ball milled limestone | 47 |
| Ground asbestos | 3 | and sufficient retarder to regulate the setting time of the mixture when mixed with water.

3. A plaster composition comprising ball milled calcined gypsum and hydrated lime in the ratio of 3:2, ball milled limestone, ground asbestos, marble dust and retarder.

4. A plaster composition consisting of finely ground calcined gypsum and hydrated lime in the ratio of 3:2, finely ground calcium carbonate, ground asbestos and retarder.

5. The method of preparing a plaster composition which comprises ballmilling calcined gypsum, ballmilling a mixture of asbestos and marble dust and mixing the ballmilled materials with hydrated lime.

JAMES S. OFFUTT.